R. I. KINNEAR.
GLAND.
APPLICATION FILED JUNE 5, 1917.

1,268,978.

Patented June 11, 1918.

Inventor:
Robert Inglis Kinnear
by [signature]
Attorney

UNITED STATES PATENT OFFICE.

ROBERT INGLIS KINNEAR, OF CLYDEBANK, SCOTLAND.

GLAND.

1,268,978.

Specification of Letters Patent.  Patented June 11, 1918.

Application filed June 5, 1917. Serial No. 173,064.

*To all whom it may concern:*

Be it known that I, ROBERT INGLIS KINNEAR, a subject of the King of the United Kingdom of Great Britain and Ireland, and residing at Clydebank, Dumbartonshire, Scotland, have invented a certain new and useful Improvement in Glands, of which the following is a specification.

In the practice of leading electric cables, rods or the like through fixed structures such, for example, as decks, bulkheads, partitions, box walls and the like, it has been the practice heretofore to form in the structure a number of apertures, one for each cable or the like, and to provide means for sealing the apertures independently, as well as may be, after the cables or the like are in position.

The present invention comprises an improved gland permitting the passage of a number of cables in such wise that the apertures traversed by the cables or the like may be rendered water-tight by one sealing operation.

A feature of the invention consists in the provision of an arrangement which permits a number of cables or the like to be passed through apertures leading to a common sealing chamber, formed in the gland, whereby there is obviated the necessity for boring and rendering water-tight in the fixed structure a set of apertures equaling in number the cables or the like to be led therethrough; the sealing of such chamber so as to close water-tightly the apertures through which the cables pass being effected in one operation by injecting a filling medium which occupies the entire cavity of the chamber, including crevices and clearances at the apertures for passage of the cables or the like through which water might pass by way of the gland for example from one compartment to another.

Another feature resides in the arrangement of end plates or walls designed so as to allow of free passage of the cables, rods or the like through apertures largely exceeding in cross-sectional dimensions those of the cables to be passed therethrough, and, further, in the arrangement of suitable split adapters which can be fitted in position after the passage of the cables and may be mechanically locked in such a way as to obviate the possibility of their being forced out under the pressure of the filling medium, or shaken out when in service due to vibration or kindred causes.

Other features will appear from the following description in connection with which it is to be understood that in practice the gland used is to be of such form and dimensions as may be found most suitable having regard to the nature of the job for which it is intended.

Figure 1:
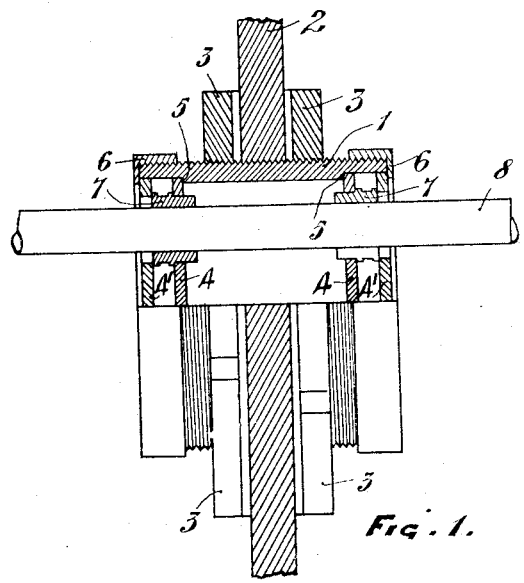
Figure 2:
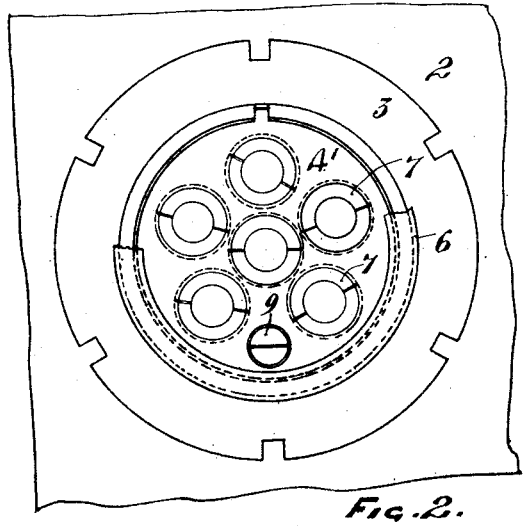

Figure 1 of the accompanying drawings illustrates in part vertical section part side elevation and Fig. 2 illustrates in end elevation one practical construction of gland according to the invention.

As shown, the improved gland is formed as an externally screw-threaded tube 1 adapted to be passed through a partition 2 or the like and secured in position by internally threaded rings or nuts 3 in engagement therewith and bearing on the faces of the partition 2 or the like.

The interior of the tube 1 presents a cavity for reception of filling medium and is adapted to be closed by removable spaced inner and outer end disks or plates 4, 4′, the inner disks 4 bearing on shoulders 5 formed in the internal cylindrical wall of the tube 1 and the outer disks 4′ being held against outward displacement by nut-forming rings 6 threaded on the exterior of the tube 1.

The end disks 4, 4′ are each formed with a number of apertures each serving for passage of a cable.

Fitted to the apertures are split tubular adapters 7, formed with annular shoulders and each freely slidable over a cable 8 or the like, in each case being mechanically locked in position between the end plates 4, 4′ which it serves to space and further secured by reason of a portion of the adapter being cemented into the filling medium, the adapters being thus positively prevented from being forced out or becoming slack, due to vibration or other causes, but being each readily capable of withdrawal by operation of a suitable tool adapted to engage in the recess between the shoulders of the adapter and to extract the adapter on the application of a slight heat in the vicinity of the adapter.

The sealing of the gland to render it water-tight is effected by forcing into the cavity through a filling orifice normally closed by a plug such as 9 fitted to each of the end walls 4 and 4' as, for example, by means of a socalled "gun" introducing into the selected filling orifice, a filling medium which in part oozes out through the apertures serving for passage of the cables, it being understood that any unused apertures formed in the end disks and any unused filling orfices are previously plugged to prevent escape of filling medium; the orifice selected for introducing the filling medium being plugged when the chamber is full.

The filling medium employed is one which is liquid when heated to a moderate temperature but is solid at normal temperatures, so that the filling medium may be readily introduced into the chamber while in liquid condition and that the leakage through the apertures in the disks 4, 4' may readily solidify at the point of discharge and envelop the cable or cables so as to effect a completely watertight closure.

As will be evident, with the adoption of a gland, constructed as described, the number of boring operations to be performed in the partition or other fixed structure through which are to be passed several cables or the like and the number of operations required to effect watertightness will be materially diminished.

In addition, with the use of split tubular adapters such as 7 the number of pieces to be threaded over each cable as it passes through each division of the structure will be reduced to a minimum, or such operation entirely dispensed with—the adapters being capable of being introduced after the cables have been led through the gland, and being locked in position in such wise as to eliminate the possibility of their being shaken or forced out when in use.

What I claim is:—

In combination, a partition wall having an orifice, an externally threaded tube fitted to said orifice and projecting beyond both sides of said wall, said tube formed at each end with an internal shoulder, nut-forming members engaging said tube and bearing against both sides of said wall, apertured inner disks fitted to said tube, one bearing against each internal shoulder, apertured outer disks spaced from said inner disks, the apertures of said inner and outer disks being in alinement, split tubular adapters fitted to the apertures of said disks, said adapters formed with shoulders bearing on the adjacent faces of said disks and serving to space said disks, and nut-forming members threaded on the ends of said tube and securing said outer disks against displacement.

In testimony whereof I have signed my name to this specification in the presence of two subscribing witnesses.

ROBERT INGLIS KINNEAR.

Witnesses:
WALLACE CRANSTON FAIRWEATHER,
HENRY MASON.